US010419782B2

(12) United States Patent
Miller et al.

(10) Patent No.: US 10,419,782 B2
(45) Date of Patent: *Sep. 17, 2019

(54) TELEVISION WITH INTERACTIVE PORTAL AND SYSTEM AND METHOD FOR USE OF SAME

(71) Applicant: Enseo, Inc., Richardson, TX (US)

(72) Inventors: Thomas R. Miller, Plano, TX (US); Vanessa Ogle, Fairview, TX (US); Charles Todd Hixon, Garland, TX (US); Craig D. Smith, Allen, TX (US)

(73) Assignee: Enseo, Inc., Richardson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/012,541

(22) Filed: Jun. 19, 2018

(65) Prior Publication Data

US 2018/0302653 A1 Oct. 18, 2018

Related U.S. Application Data

(63) Continuation-in-part of application No. 15/847,247, filed on Dec. 19, 2017, now Pat. No. 10,142,663,
(Continued)

(51) Int. Cl.
*H04W 4/80* (2018.01)
*H04N 21/25* (2011.01)
(Continued)

(52) U.S. Cl.
CPC ....... *H04N 21/2143* (2013.01); *H04L 63/083* (2013.01); *H04L 67/306* (2013.01); *H04N 21/25* (2013.01); *H04N 21/4131* (2013.01); *H04N 21/43615* (2013.01); *H04N 21/478* (2013.01); *H04N 21/8126* (2013.01);
(Continued)

(58) Field of Classification Search
CPC . H04N 7/106; H04N 21/4622; H04N 7/17354
See application file for complete search history.

(56) References Cited

U.S. PATENT DOCUMENTS

5,661,517 A 8/1997 Budow et al.
9,088,828 B2 7/2015 Ogle et al.
(Continued)

*Primary Examiner* — Sumaiya A Chowdhury
(74) *Attorney, Agent, or Firm* — Scott T. Griggs; Griggs Bergen LLP (57) ABSTRACT

A television with an interactive portal and system and method for use of the same are disclosed. In one embodiment of the television, the television is deployed to provide an interactive portal in a hospitality establishment having multiple rooms, such as a hotel. The television is associated with a room and includes a processor, memory, tuner, panel, and audio drive disposed in an interconnected busing architecture. The television generates a default interactive portal as well as a guest-specific interactive portal, which is generated from a guest configuration profile having information including guest identification, a guest channel preference presentation, and a guest service preference presentation with guest account information. The guest configuration profile may also enable the creation of a local area wireless network with substantially the same behavior as the guest's home wireless network.

20 Claims, 5 Drawing Sheets

Related U.S. Application Data which is a continuation of application No. 15/625,416, filed on Jun. 16, 2017, now Pat. No. 9,848,211, which is a continuation of application No. 15/203,515, filed on Jul. 6, 2016, now Pat. No. 9,716,902, which is a continuation-in-part of application No. 14/803,428, filed on Jul. 20, 2015, now Pat. No. 9,326,009, which is a continuation of application No. 14/294,123, filed on Jun. 2, 2014, now Pat. No. 9,088,828.

(60) Provisional application No. 62/524,009, filed on Jun. 23, 2017, provisional application No. 62/188,976, filed on Jul. 6, 2015, provisional application No. 61/829,932, filed on May 31, 2013.

(51) Int. Cl.

| | |
|---|---|
| *H04N 21/41* | (2011.01) |
| *H04N 21/81* | (2011.01) |
| *H04N 21/214* | (2011.01) |
| *H04N 21/436* | (2011.01) |
| *H04N 21/478* | (2011.01) |
| *H04L 29/08* | (2006.01) |
| *H04L 29/06* | (2006.01) |
| *H04W 12/06* | (2009.01) |

(52) U.S. Cl.
CPC ......... *H04N 21/8146* (2013.01); *H04W 4/80* (2018.02); *H04W 12/06* (2013.01)

(56) References Cited

U.S. PATENT DOCUMENTS

| | | | |
|---|---|---|---|
| 9,326,009 B2 | 4/2016 | Ogle et al. | |
| 9,716,902 B2 | 7/2017 | Ogle et al. | |
| 9,848,211 B2 | 12/2017 | Ogle et al. | |
| 2003/0061077 A1 | 3/2003 | Sagar | |
| 2004/0019513 A1* | 1/2004 | Colalancia | G06Q 10/02 705/7.15 |
| 2007/0050197 A1* | 3/2007 | Efron | G06Q 10/02 705/26.1 |
| 2008/0319807 A1* | 12/2008 | Weiss | G06Q 10/02 705/5 |
| 2010/0211489 A1* | 8/2010 | Zhang | G06Q 30/02 705/34 |
| 2010/0250707 A1* | 9/2010 | Dalley | G06Q 10/10 709/219 |
| 2015/0276238 A1 | 10/2015 | Matsuoka | |
| 2016/0330488 A1 | 11/2016 | Ogle et al. | |
| 2017/0046650 A1* | 2/2017 | Mulji | G06Q 50/12 |
| 2018/0109815 A1 | 4/2018 | Ogle et al. | |

* cited by examiner

TELEVISION WITH INTERACTIVE PORTAL AND SYSTEM AND METHOD FOR USE OF SAME

PRIORITY STATEMENT & CROSS-REFERENCE TO RELATED APPLICATIONS

This application claims priority from co-pending U.S. Patent Application No. 62/524,009, entitled "Television with Interactive Portal and System and Method for Use of Same," filed on Jun. 23, 2017, in the names of Vanessa Ogle et al.; which is hereby incorporated by reference for all purposes. This application is also a continuation-in-part of co-pending U.S. patent application Ser. No. 15/847,247, entitled "Set-Top Box with Interactive Portal and System and Method for Use of Same," filed on Dec. 19, 2017, in the names of Vanessa Ogle et al.; which is a continuation of U.S. patent application Ser. No. 15/625,416, entitled "Set-Top Box with Interactive Portal and System and Method for Use of Same," filed on Jun. 16, 2017, in the names of Vanessa Ogle et al., and issued on Dec. 19, 2017, as U.S. Pat. No. 9,848,211; which is a continuation of U.S. patent application Ser. No. 15/203,515, entitled "Set-top Box with Interactive Portal and System and Method for Use of Same," filed on Jul. 6, 2016, in the names of Vanessa Ogle et al., and issued on Jul. 25, 2017, as U.S. Pat. No. 9,716,902; which claims priority from U.S. Patent Application Ser. No. 62/188,976, entitled "Set-top Box with Interactive Portal and System and Method for Use of Same" filed on Jul. 6, 2015, in the names of Vanessa Ogle et al.; all of which are hereby incorporated by reference for all purposes herein. U.S. patent application Ser. No. 15/203,515, entitled "Set-top Box with Interactive Portal and System and Method for Use of Same" and filed on Jul. 6, 2016, in the names of Vanessa Ogle et al., and issued on Jul. 25, 2017, as U.S. Pat. No. 9,716,902, is also a continuation-in-part of U.S. patent application Ser. No. 14/803,428, entitled "Set-Top Box with Interactive Portal and System and Method for Use of Same," filed on Jul. 20, 2015, in the names of Vanessa Ogle et al., and issued on Apr. 26, 2016, as U.S. Pat. No. 9,326,009; which is a continuation of U.S. patent application Ser. No. 14/294,123, entitled "Set-top Box with Interactive Portal and System and Method for Use of Same" and filed on Jun. 2, 2014, in the names of Vanessa Ogle et al., and issued on Jul. 21, 2015 as U.S. Pat. No. 9,088,828; which claims priority from U.S. patent application Ser. No. 61/829,932, entitled "On-Screen Display," filed on May 31, 2013, in the name of Vanessa Ogle; all of which are hereby incorporated by reference for all purposes.

TECHNICAL FIELD OF THE INVENTION

This invention relates, in general, to televisions and, in particular, to televisions with interactive portals and systems and methods for use of the same that provide additional functionality to the hospitality lodging industry, as an example.

BACKGROUND OF THE INVENTION

Without limiting the scope of the present invention, the background will be described in relation to the use of smart devices in the hospitality lodging industry, as an example. Making a hotel "a home away from home" is a goal of many hoteliers in the hospitality lodging industry. Hotels are providing more amenities and conveniences than ever for the comfort of patrons in order to offer superior advantages for guests. Traditionally, amenities and conveniences focused on the quality of the room, in-room entertainment, food and beverage service, on-premise amenities such as gyms and spas, and concierge service. With the explosion of the internet, smartphones, and other smart devices, the usability and ease of use of these smart devices at hospitality lodging establishments has become a necessary amenity and convenience. Accordingly, there is a need for improved systems and methods that ensure amenities that provide for the use of smart devices in a hospitality lodging establishment, while providing the convenience and integration into existing and planned hospitality lodging establishments.

SUMMARY OF THE INVENTION

It would be advantageous to introduce systems and methods that further ensure amenities that provide for the use of proximate wireless-enabled interactive programmable devices in a hospitality lodging establishment. It would also be desirable to enable a computer-based solution that would augment the convenience and integration of a guest-customized experience into existing and planned hospitality lodging establishments. To better address one or more of these concerns, a television with an interactive portal and system and method for use of the same are disclosed. In one embodiment of the television, the television is deployed to provide an interactive portal in a hospitality establishment having multiple rooms, such as a hotel.

The television is associated with a room and includes a processor, memory, tuner, panel, and audio drive disposed in an interconnected busing architecture. The television generates a default interactive portal as well as a guest-specific interactive portal, which is generated from a guest configuration profile having information including guest identification, a guest channel preference presentation, and a guest service preference presentation with guest account information. In response to receiving the guest configuration profile, a local area wireless network for a guest device may be activated to a network associated with the hospitality establishment. The local area wireless network may have substantially identical behavior to a home wireless network belonging to the guest such that the local area wireless network provides substantially identical network configuration and device, application, and service login credentials as the home wireless network. In another embodiment, a system deploys the televisions in rooms throughout the lodging establishment to provide both a default and the convenience of a guest-specific interactive portal in each room. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
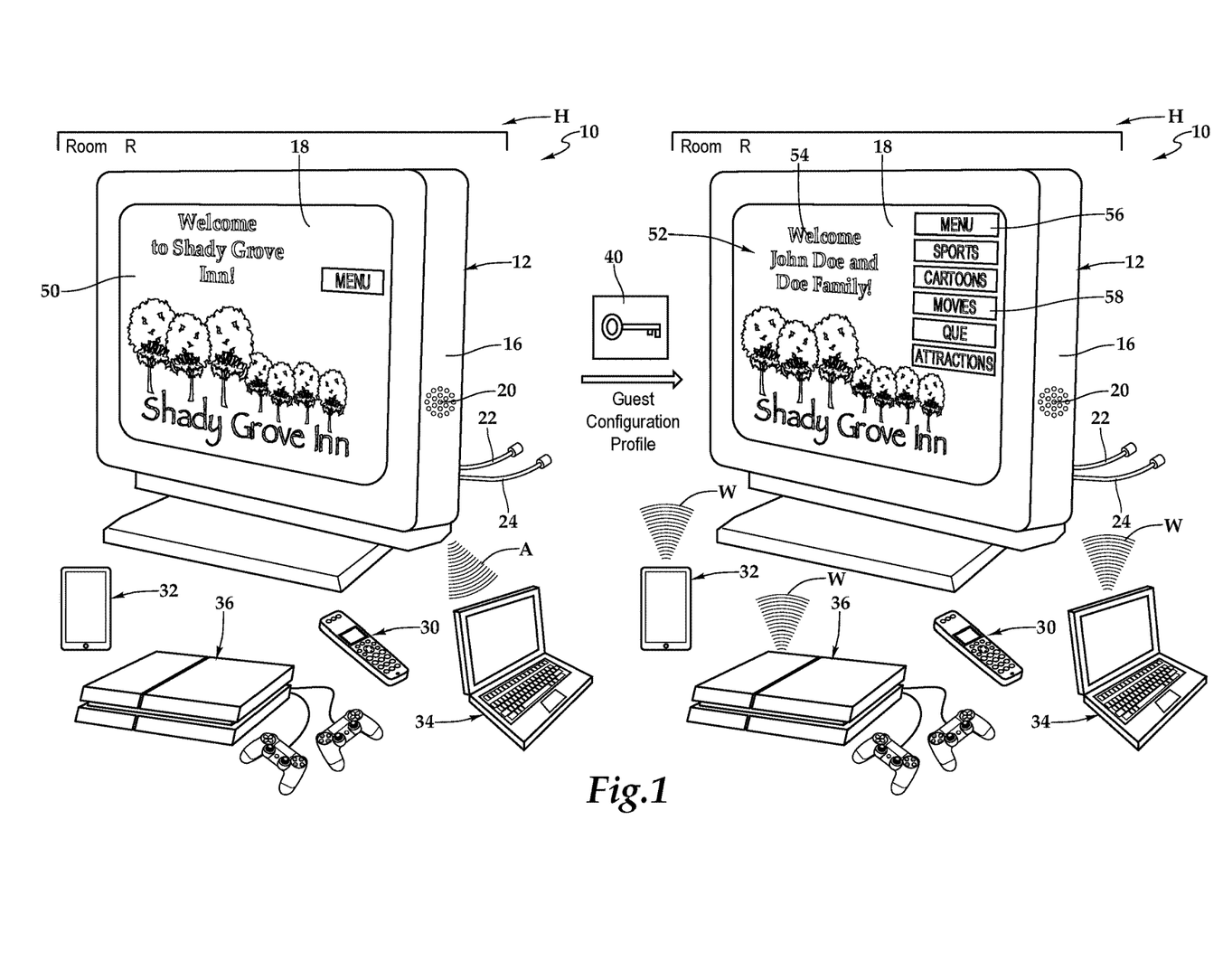
FIG. 1 is a schematic diagram depicting one embodiment of a system utilizing a television having a guest configuration profile thereon according to the teachings presented herein.

Referring initially to FIG. 1, therein is depicted one embodiment of a system 10 utilizing televisions, such as television 12, with guest-specific interactive portals being employed within a hospitality lodging establishment H. The television 12 includes a housing 16 with a panel 18 and speakers 20. The hospitality lodging establishment H or more generally, hospitality property, may be a furnished multi-family residence, dormitory, lodging establishment, hotel, hospital, or other multi-unit environment. As shown, by way of example and not by way of limitation, the hospitality lodging establishment is depicted as a hotel having various rooms and spaces, including room R. The televisions, including television 12, are communicatively disposed with various amenities associated with the hospitality environment within the hospitality establishment H. The televisions, including television 12, may be deployed throughout the rooms R of the hotel.

As shown, in one embodiment, within the room R, the system 10 includes the television 12 having, for example, a power cable 22 coupling the television 12 to a power source and a coaxial cable 24 coupling the television 12 to an external cable source. It should be appreciated that the cabling connected to the television 12 will depend on the environment and application and the cabling connections presented in FIG. 1 are depicted for illustrative purposes. The actual cabling arrangement employed may vary and will depend on the particular implementation.

A television remote control 30 includes an array of buttons for adjusting various settings such as television channel and volume. In one embodiment, the television remote control 30 may be a consumer infrared (IR) or other protocol, such as Bluetooth, device configured as a small wireless handheld object that issues commands from a distance to the television 12. A proximate wireless-enabled interactive programmable device 32 may be a wireless-enabled interactive handheld device that may be supplied or carried by the guest and may be selected from a range of existing devices, such as, for example iPads®, iPhones®, iPod Touch®, Android® devices, Blackberry® devices, personal computers, laptops, tablet computers, smart phones, and smart watches, for example. As will be discussed in further detail below, in one implementation, an application installed from a server enables the television 12 and the proximate wireless-enabled interactive programmable device 32 to be wirelessly paired. In another embodiment, a challenge-response is utilized to wirelessly pair the television 12 and the proximate wireless-enabled interactive programmable device 32. Similar to the proximate wireless-enabled interactive programmable device 32, a personal computer 34 and game console 36 are also depicted in the room R.

As shown, a default interactive portal 50 is displayed on the panel 18, unless a guest configuration profile 40 is loaded within the television 12. The guest configuration profile 40 may be loaded from the operations, e.g., the front desk or hotel headend, by use of the television remote control 30, or by a proximate device, such as the proximate wireless-enabled interactive programmable device 32, personal computer 34, or game console 36. In one implementation, as illustrated, the television 12 extends a physical authorization interface, shown as area A, from the television 12 to an area easily accessible to transitory guest's convenience such as in front or side of the television 12. This physical authorization interface A may include a short range wireless data connection that is enabled only when very close physically to the proximate wireless-enabled interactive programmable device 32, for example. Further, once the pairing is established, the television 12 provides a secure wireless interface to communicate transitory guest user device authorization information to the television 12 to accomplish verification. Once authorization information is communicated to the display, the television 12 enables the guest configuration profile.

Enabled, the guest configuration profile 40 provides a customized display experience. More particularly, the guest configuration profile 40 includes guest identification, a guest channel preference presentation, and a guest service preference presentation with guest account information. The guest configuration profile 40 is a guest-specific, guest-customized television generated environment referencing an explicit digital representation of a guest's identity. The television 12 generates a guest interactive portal 52 including a guest indication acknowledgement 54, a guest channel preference presentation 56, and a guest service preference presentation 58, which includes premium programming, game, and music content, for example. Further, personal area network and local area network connectivity is provided to the proximate wireless-enabled interactive programmable device 32, personal computer 34, and game console 36 as shown by the Wi-Fi indicator W.

Figure 2A:
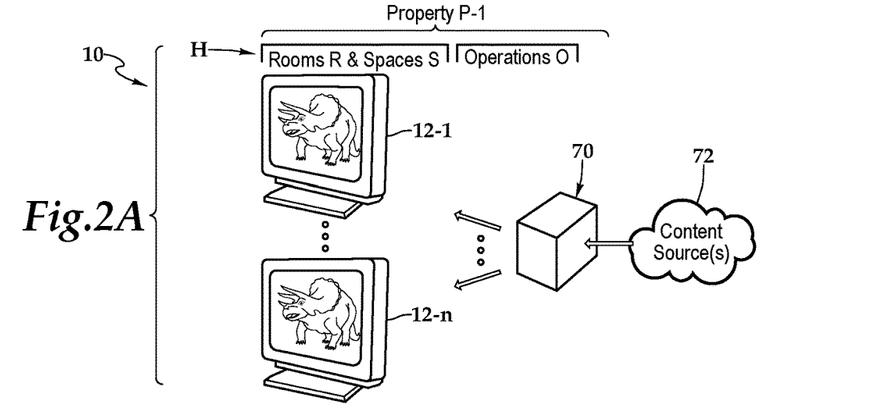
FIG. 2A is a schematic diagram depicting one embodiment of the system of FIG. 1 within an on-property deployment.

Referring now to FIG. 2A, it should be appreciated that a server 70 may be located on a single property to serve one or more televisions thereon. Alternatively, in one embodiment, it should be appreciated that the server 70 may be remotely located to serve multiple properties having multiple televisions. Continuing to refer to FIG. 2A, the system 10 may be deployed such that the server 70 is co-located on the property P-1 within the hospitality lodging establishment H within operations O with the televisions 12-1 ... 12-n located within rooms R and spaces S such as lobbies, restaurants and the like with, in one embodiment, content sources 72 configured to provide sources of content. As shown, the server 70 includes a housing having a television output and other components therein. As previously alluded, the server 70 may store the necessary guest configuration profile 40 in a database of guest configuration profiles for access by the television 12 or, alternatively, for downloading prior to use by the television 12.

Figure 2B:
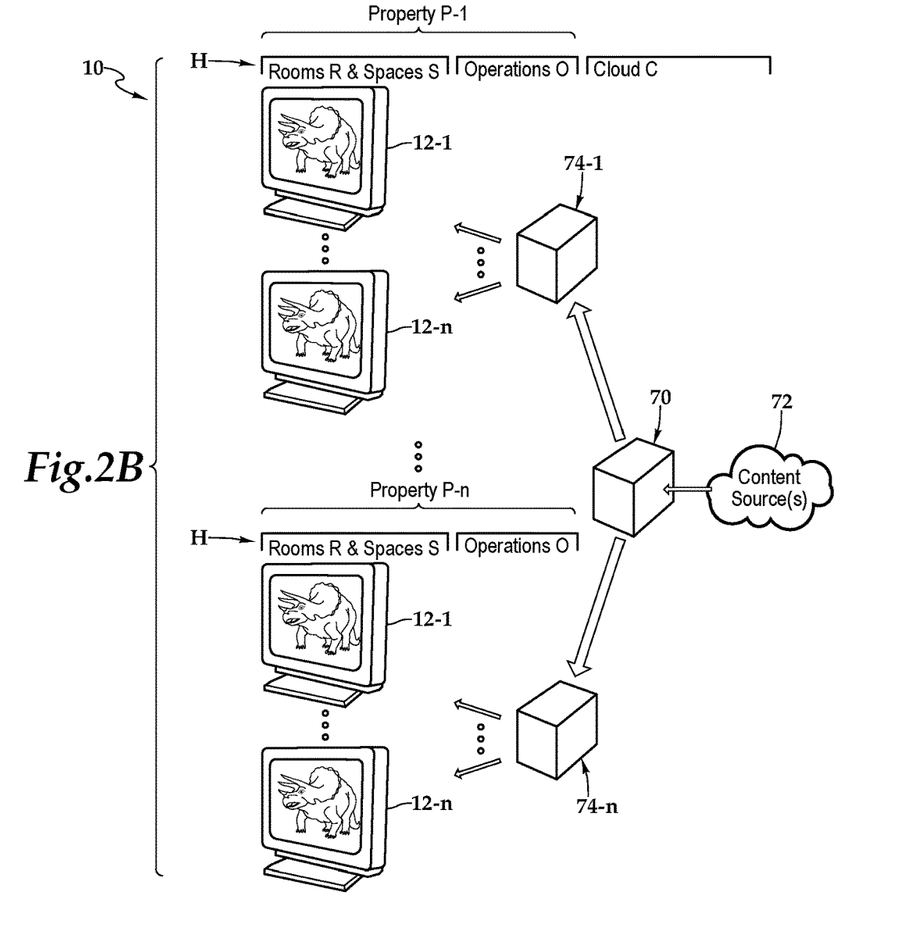
FIG. 2B is a schematic diagram depicting one embodiment of the system of FIG. 1 within a cloud-computing deployment.

Referring to FIG. 2B, the system 10 may be deployed such that the server 70 is located remotely within cloud C relative to the televisions 12-1 . . . 12-*n*, which are located at properties P-1 through P-n. In particular, the server 70, which receives content from content sources 72, may be located remotely relative to the televisions 12-1 . . . 12-*n* such that a property headend 74-1 . . . 74-*n* is interposed between the server 70 and the televisions 12-1 . . . 12-*n*. As shown, in this implementation, the property headend 74-1 . . . 74-*n* is co-located with the televisions 12-1 . . . 12-*n* at a respective property, P-1 through P-n. As previously discussed, the server 70 may store the necessary guest configuration profile 40 in a database of guest configuration profiles for access by the television 12 or, alternatively, for downloading prior to use by the television 12.

Figure 3:
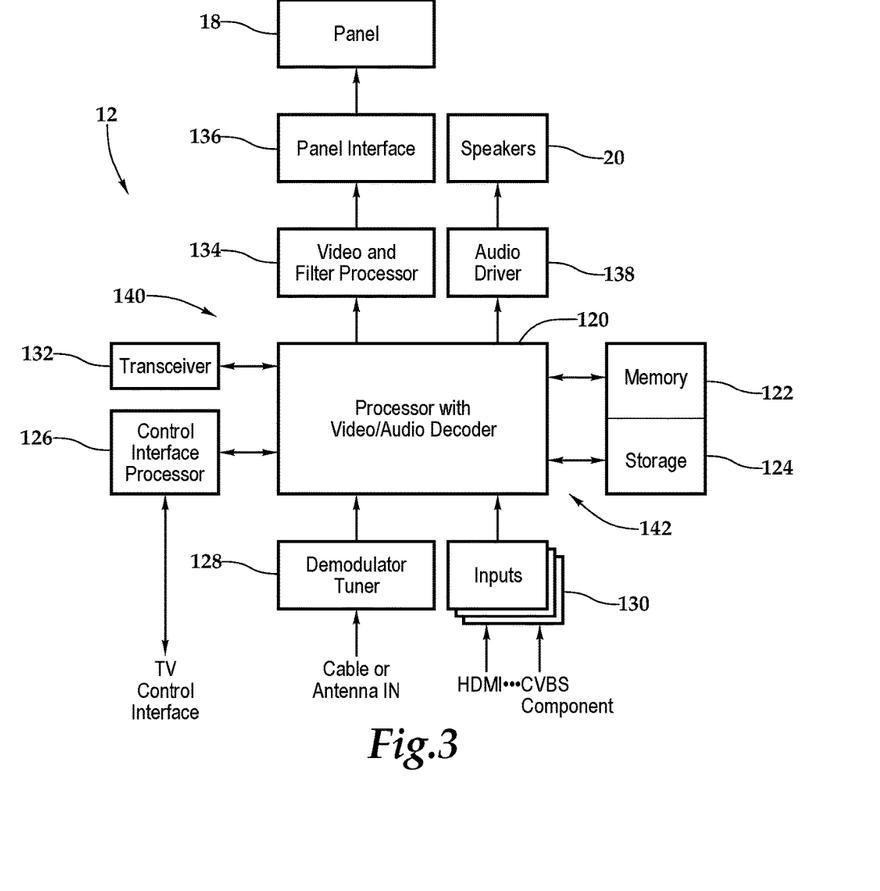
FIG. 3 is a functional block diagram depicting one embodiment of the television presented in FIG. 1 in further detail.

Referring now to FIG. 3, the television 12 may be a telecommunication medium used for transmitting sound with moving images in black-and-white or color in two or three dimensions. As used herein, television may refer to a television set or a display operating with television functionality. By way of further example, as used herein, television may include smart televisions, sometimes referred to as connected televisions or hybrid televisions that include televisions having convergent functionality with computers and set-top boxes, including integrated Internet features. Such smart televisions may provide traditional broadcasting media as well as Internet television, online interactive media, over-the-top content, as well as on-demand streaming media, for example. As shown, the television 12 includes a processor 120 with video/audio decoder having memory 122, storage 124, a control interface processor 126, and a transceiver 132 connected therewith. A demodulator tuner 128 provides an input as do inputs 130. The processor 120 drives a signal to the video and filter processor 134, which in turn, drives a signal to a panel interface 136 and onto a panel 18, which may serve as a screen or display. Additionally, the processor 120 drives a signal to the audio driver 138, which in turn, drives a signal to speakers 20.

The processor 120 with video/audio decoder may process instructions for execution within the computing device, including instructions stored in the memory 122 or in the storage 124. In one embodiment, the video/audio decoder functionality of the processor 120 provides for the conversion of base-band analog video signals to digital components video while allowing programmable control over video characteristics such as hue, contrast, and saturation. The memory 122 stores information within the computing device, as shown, the television 12. In one implementation, the memory 122 is a volatile memory unit or units. In another implementation, the memory 122 is a non-volatile memory unit or units. Storage 124 provides capacity that is capable of providing mass storage for the television 12.

In one implementation, the control interface processor 126 may execute instructions relative to a self-diagnosis television control interface. Further, the self-diagnosis interface may be selected from RJ25 ports, RS232 ports, RS422 ports, RS485 ports, multiple protocol interfaces (MPIs), and multiple television interfaces (MTIs), for example. As depicted, the control interface may include an RS232 standard DB-25 connection for the serial communication transmission of data. Such a connection formally defines the signals connecting between a DTE (data terminal equipment) such as a computer terminal, and a DCE (data circuit-terminating equipment, originally defined as data communication equipment).

The demodulator tuner 128 recovers the information content from a modulated carrier wave received from cable or an antenna, for example, and appropriately adjusts the resonance frequency of the received modulated carrier wave for further processing by the processor. As discussed, various inputs 130 provide connections to the television 12, wherein the inputs 130 are the signals or data received by the television 12. In the illustrated example, the inputs 130 may include an HDMI interface or CVBS component, for example. The transceiver 132 is associated with the television 12 and communicatively disposed with the architecture. As shown the transceiver 132 may be internal, external, or a combination thereof with respect to the housing of the television 12. Communication between various amenities in the hotel room, including even the remote control 30, and the television 12 may be enabled by a variety of wireless methodologies employed by the transceiver 132, including 802.11, 802.11 a/b/g/n/ac, 3G, 4G, Edge, Wi-Fi, ZigBee, near field communications (NFC), Bluetooth low energy and Bluetooth, for example. Also, infrared (IR) may be utilized.

The video and filter processor 134 performs a complete or partial suppression of some aspect of the signal received from the processor 120 in order to remove some frequencies to suppress interfering signals and reduce background noise and adjust image quality. The panel interface 136 specifies a video connection and signaling that drives the panel 18, which may be a liquid crystal display, plasma panel, electroluminescent panel, or organic light-emitting diode panel, for example. The audio driver 138 specifies the audio connection and signaling that drives an electrical audio signal to the speakers 20, which convert the electrical audio signal into a corresponding sound.

As described, the television 12 is associated with a room R and includes, a processor 140, memory 122, a tuner shown as demodulator tuner 128, a panel 18 and an audio driver 138 therein in an interconnected busing architecture 142. It should be appreciated that although a particular architecture is shown, the teachings prescribed herein are applicable to other architectures. By way of example, the processors 120, 126, and 134 may be partially or fully integrated and represented as the processor 140. The memory 122 and storage 124 are accessible to the processor 140 and include processor-executable instructions that, when executed, cause the processor 140 to execute a series of operations.

In one embodiment, the processor-executable instructions receive the guest configuration profile 40, which as previously discussed may include guest identification, a guest channel preference presentation 56, and a guest service preference presentation 58 with guest account information. Also, as previously discussed, the guest configuration profile 40 is a guest-specific, guest-customized television generated environment referencing an explicit digital representation of a guest's identity. In response to receiving the guest configuration profile 40 at the television 12, the processor-executable instructions cause the processor 140 to temporarily override the default profile and generate a guest interactive portal 52 including a guest indication acknowledgement 54, the guest channel preference presentation 56, and the guest service preference presentation 58. Further, in response to receiving the guest configuration profile 40, the processor-executable instructions cause the processor 140 to activate a local area wireless connection for a guest device, such as the proximate wireless-enabled interactive programmable device 32, to a network associated with the hospitality lodging establishment H. Alternatively, in response to a default profile, the processor-executable instructions cause the processor 140 to generate a default interactive portal 50 prior to forwarding one of the guest interactive portal 52 and the default interactive portal 52, as appropriate, to the television 12 via the television output. In implementations with multiple televisions disposed in respective multiple rooms, at least one of the televisions will generate a guest interactive portal and at least one of the plurality of televisions will potentially generate a default interactive portal.

Figure 4:
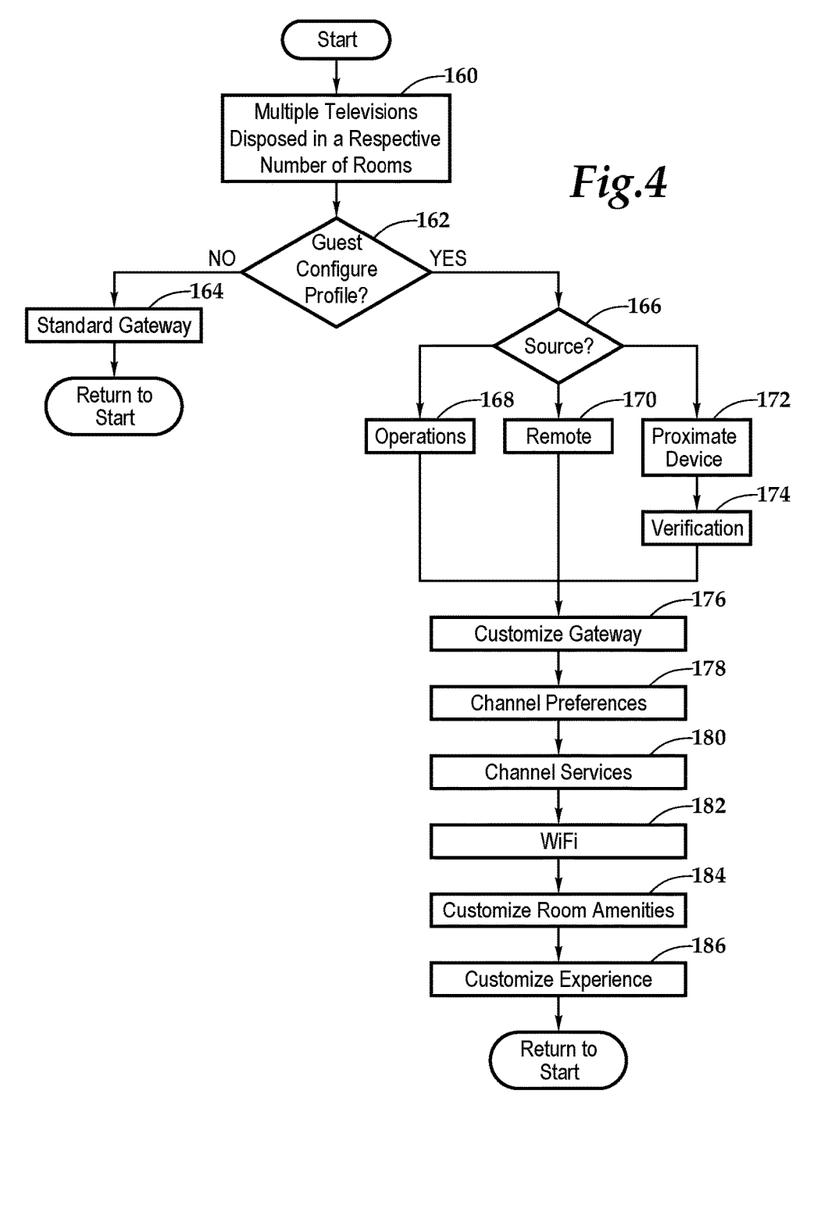
FIG. 4 is a flow chart depicting one embodiment of a method for providing a television having a guest configuration profile thereon according to the teachings presented herein.

Referring now to FIG. 4, a method for using a television with an interactive portal is shown. At block 160, multiple televisions are disposed in a respective number of rooms within a lodging establishment. At decision block 162, if a guest configuration profile is not available then the methodology advances to block 164 where a standard gateway and interactive experience is provided before the method returns to start. On the other hand, if a guest configuration profile is available, then the process advances to decision block 166 where the guest configuration profile is installed from the appropriate source. At block 168, installation is provided from hotel operations, such as a front desk or hotel headend. At block 170, the remote control in the room may provide the guest configuration profile. As a third alternative, at block 172, a proximate wireless-enabled interactive programmable device may be further verified at block 174 and provide the guest configuration profile.

Following blocks 168, 170, and 172-174, the methodology continues to block 176, wherein a customized interactive portal is built based on the guest configuration profile. The customized interactive portal may include the guest's name or similar information. Continuing with blocks 178, 180, 182, 184, and 186, the methodology customizes the channel preferences, channel services, local area network connectivity, e.g., Wi-Fi, for devices, customizes room amenities, and customizes the experience, such as a hospitality lodging establishment experience, in accordance with the guest configuration profile.

That is, in one implementation, following this methodology, various guest devices, such as the aforementioned proximate wireless-enabled interactive programmable devices and personal computers, may be registered and associated with the television for the purpose of joining personal area networks or local area networks to enable various services on that network requiring authorization.

Figure 5:
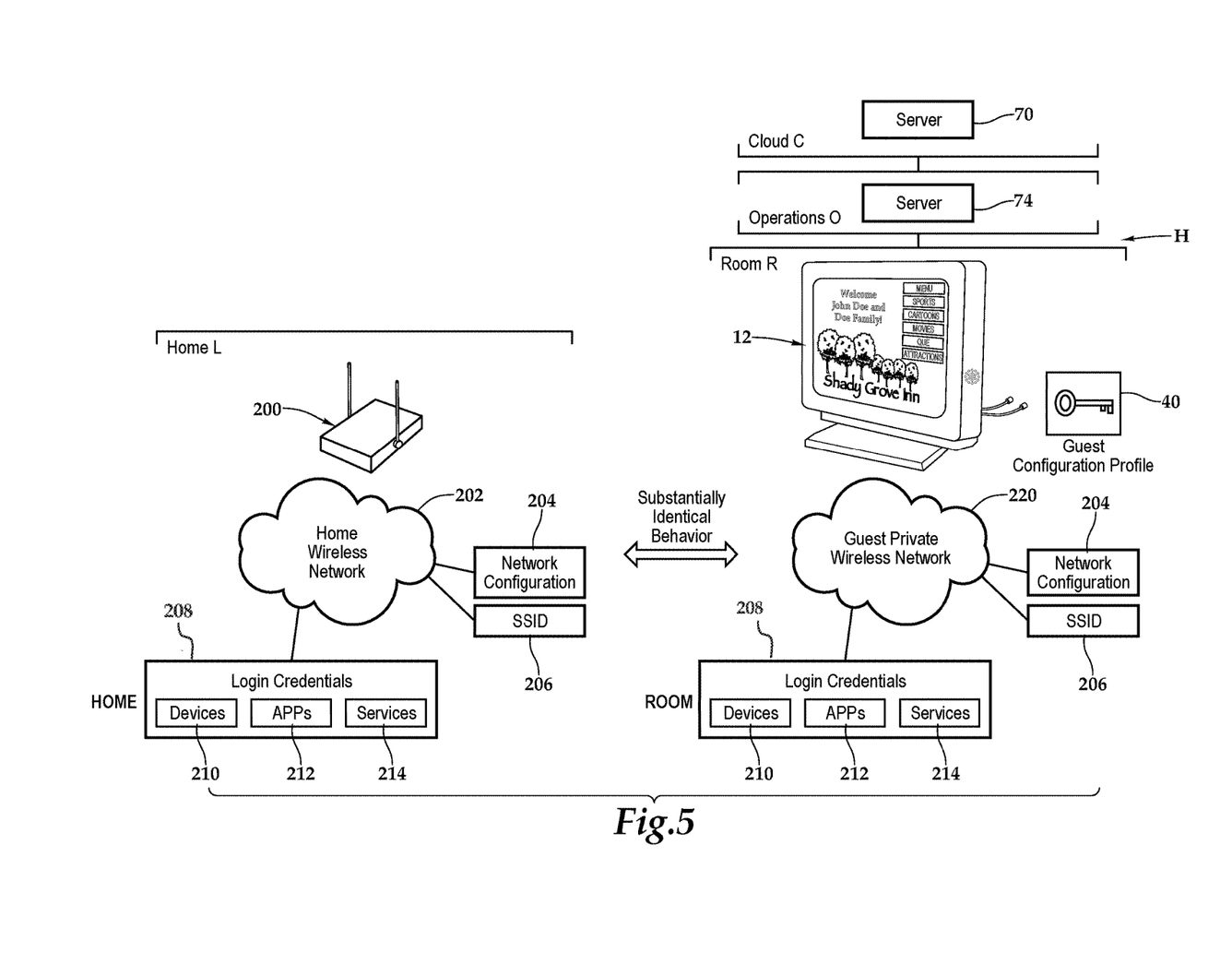
FIG. 5 is a schematic diagram depicting one embodiment of the structure and functionality of the system depicted in FIG. 1.

Referring now to FIG. 5, at a guest's home L, a wireless access point 200 provides the networking hardware device, such as a router, that allows Wi-Fi compliant devices to connect to a wired network by way of a private wireless network, which is illustrated as home wireless network 202. The home wireless network 202 has a network configuration 204, which provides the network management protocol and mechanisms to install, manipulate, and delete the configuration of various network devices. Such a network configuration may also include a network identification, which is shown as a Service Set Identifier (SSID) 206. In one implementation, the SSID 206 may be a series of 0 to 32 octets that is used as an identifier for the wireless Local Area Network (LAN) and is intended to be unique for the particular home wireless network 202. Various login credentials 208 are also associated with the home wireless network 202. The login credentials 208 may include user names and passwords that permit various devices 210, applications 212, and services 214 to operate over the home wireless network 202. The devices 210 may include the proximate wireless-enabled interactive programmable device 32, the personal computer 34, or the game console 36. The applications 212 may include a computer program designed to perform a group of coordinated functions, tasks, or activities operating on the devices 210 for the benefit of the user, which in this instance is the guest. The services 214 may include various subscription or non-subscription services that provide access to streaming or archived content, such as literature, music, television, and movies, for example. The services 214 may enabled by the devices 210. It should be appreciated that overlap between the devices 210, the applications 212, and the services 214 may exist.

The home wireless network 202 permits the users or guest's devices 210, applications 212, and services 214 to work seamlessly at the home L without the need for continuous new configuration. The aforementioned guest configuration profile 40 associated with the television 12 within the room R of the hospitality lodging establishment H configures a guest private wireless network 220 that acts as an access point having the same network configuration 204, SSID 206, and login credentials 208 for the devices 210, the applications 212, and the services 214. This creates a home away from home environment for the guest, where all of the guest carry devices, applications, and services, including streaming movie services, work at within the room R as the guest carry devices, applications, and services work at the home wireless network 202 at the home L. In one embodiment, the guest configuration profile 40 provides the guest private wireless network 220 with substantially identical behavior as the home wireless network 202. Therefore, no new configuration is required at the room R. In one implementation, the guest configuration profile 40 may access the information and data necessary to provision the guest private wireless network 220 from the server 74, which is located in operations O, or a server 70, which may be located offsite or within a cloud C, for example. In operation, in response to receiving the guest configuration profile 40, a local area wireless network may be activated for a guest device to a network associated with the hospitality lodging establishment H. The local area wireless network may have substantially identical behavior to a home wireless network belonging to the guest such that the local area wireless network provides substantially identical network configuration and device, application, and service login credentials as the home wireless network. In particular, the guest configuration profile 40 may enable the creation of a local area wireless network with substantially the same behavior as the guest's home wireless network. As previously alluded, the guest configuration profile 40 not only establishes the guest private wireless network 220, but may also provision room-specific guest preferred features such as room temperature, television lineup, and other amenity preferences.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for configuring a guest experience in a hospitality establishment having a plurality of rooms, the system comprising:

a plurality of televisions respectively disposed in the plurality of rooms, each television programmably assigned to a respective room, each television comprising:
- a processor, memory, tuner, panel, and audio drive disposed in an interconnected busing architecture;
- the memory accessible to the processor, the memory including processor-executable instructions that, when executed, cause the processor to:
  - receive a guest configuration profile, the guest configuration profile including guest identification, a guest channel preference presentation, and a guest service preference presentation with guest account information, the guest configuration profile being a guest-specific, guest-customized television generated environment referencing an explicit digital representation of a guest's identity;
  - in response to receiving the guest configuration profile, temporarily override the default profile and generate a guest interactive portal including a guest indication acknowledgement, the guest channel preference presentation, and the guest service preference presentation;
  - in response to receiving the guest configuration profile, activate a local area wireless network for a guest device to a network associated with the hospitality establishment;
  - the local area wireless network having identical behavior to a home wireless network belonging to the guest, the local area wireless network providing identical network configuration and device login credentials as the home wireless network;
  - in response to receiving a default profile, generate a default interactive portal; and
  - forward one of the guest interactive portal and the default interactive portal to the television via the television output;
- wherein at least one of the plurality of televisions respectively disposed in the plurality of rooms generates a guest interactive portal and at least one of the plurality of televisions respectively disposed in the plurality of rooms generates a default interactive portal;
- the guest configuration profile configuring the local area wireless network to be a guest private wireless network that acts as an access point having the same network configuration, SSID, and login credentials for devices, applications, and services as the home wireless network belonging to the guest, thereby creating a home away from home environment for the guest with provisioning for room-specific guest preferred features, including room temperature and television lineup; and
- the guest configuration profile requiring no new room configuration, the guest configuration profile accessing needed information and data to provision the guest wireless network from one of a co-located server and a cloud-located server.

2. The system as recited in claim 1, wherein in response to receiving the guest configuration profile, the memory includes processor-executable instructions that, when executed, cause the processor to activate a local area wireless connection for a guest device to a network associated with the hospitality establishment.

3. The system as recited in claim 1, wherein the memory includes processor-executable instructions that, when executed, cause the processor to receive a guest configuration profile via a wireless signal received at a transceiver associated with the television, the transceiver being coupled to the busing architecture.

4. The system as recited in claim 3, wherein the wireless signal is selected from the group of wireless protocols consisting of 802.11, 802.11 a/b/g/n/ac, 3G, 4G, Edge, Wi-Fi, ZigBee, near field communications (NFC), Bluetooth, and infrared (IR).

5. The system as recited in claim 3, wherein the wireless signal is transmitted to the television from a wireless-enabled interactive handheld device.

6. The system as recited in claim 3, wherein the wireless signal is transmitted to the television from a remote control paired with the television.

7. The system as recited in claim 1, wherein the memory includes processor-executable instructions that, when executed, cause the processor to receive a guest configuration profile via a television input, the television input being coupled to the busing architecture.

8. The system as recited in claim 7, wherein the guest configuration profile originates from a hospitality establishment location selected from the front desk and hotel head-end.

9. The system as recited in claim 1, wherein the guest configuration profile further includes control settings for room amenities.

10. The system as recited in claim 1, wherein the guest configuration profile further includes preferences for the lodging establishment experience.

11. A television with an interactive portal for use in a hospitality establishment having a plurality of rooms, the television comprising:
- a processor, memory, tuner, panel, and audio drive disposed in an interconnected busing architecture, the memory-processor combination associated with an assigned room of the plurality of rooms;
- the memory accessible to the processor, the memory including processor-executable instructions that, when executed, cause the processor to:
  - receive a guest configuration profile, the guest configuration profile including guest identification, a guest channel preference presentation, and a guest service preference presentation with guest account information, the guest configuration profile being a guest-specific, guest-customized television generated environment referencing an explicit digital representation of a guest's identity;
  - in response to receiving the guest configuration profile, temporarily override the default profile and generate a guest interactive portal including a guest indication acknowledgement, the guest channel preference presentation, and the guest service preference presentation;
  - in response to receiving the guest configuration profile, activate a local area wireless network for a guest device to a network associated with the hospitality establishment;
  - the local area wireless network having identical behavior to a home wireless network belonging to the guest, the local area wireless network providing identical network configuration and device and application login credentials as the home wireless network;
  - in response to receiving a default profile, generate a default interactive portal;

forward one of the guest interactive portal and the default interactive portal to the television via the television output;

the guest configuration profile configuring the local area wireless network to be a guest private wireless network that acts as an access point having the same network configuration, SSID, and login credentials for devices, applications, and services as the home wireless network belonging to the guest, thereby creating a home away from home environment for the guest with provisioning for room-specific guest preferred features, including room temperature and television lineup; and the guest configuration profile requiring no new room configuration, the guest configuration profile accessing needed information and data to provision the guest wireless network from one of a co-located server and a cloud-located server.

12. The television as recited in claim 11, wherein in response to receiving the guest configuration profile, the memory includes processor-executable instructions that, when executed, cause the processor to activate a local area wireless connection for a guest device to a network associated with the hospitality establishment.

13. The television as recited in claim 11, wherein the memory includes processor-executable instructions that, when executed, cause the processor to receive a guest configuration profile via a wireless signal received at a transceiver associated with the television, the transceiver being coupled to the busing architecture.

14. The television as recited in claim 13, wherein the wireless signal is selected from the group of wireless protocols consisting of 802.11, 3G, 4G, Edge, Wi-Fi, ZigBee, near field communications (NFC), Bluetooth, and infrared (IR).

15. The television as recited in claim 13, wherein the wireless signal is transmitted to the television from a wireless-enabled interactive handheld device.

16. The television as recited in claim 13, wherein the wireless signal is transmitted to the television from a remote control paired with the television.

17. The television as recited in claim 11, wherein the memory includes processor-executable instructions that, when executed, cause the processor to receive a guest configuration profile via a television input, the television input being coupled to the busing architecture.

18. The television as recited in claim 17, wherein the guest configuration profile originates from a hospitality establishment location selected from the front desk and hotel headend.

19. A television with an interactive portal for use a hospitality establishment having a plurality of rooms, the television comprising:

a processor, memory, tuner, panel, and audio drive disposed in an interconnected busing architecture;

the memory-processor combination associated with the assigned room; and the memory accessible to the processor, the memory including processor-executable instructions that, when executed, cause the processor to:

receive a guest configuration profile, the guest configuration profile including guest identification, a guest channel preference presentation, and a guest service preference presentation with guest account information, the guest configuration profile being a guest-specific, guest-customized television generated environment referencing an explicit digital representation of a guest's identity;

in response to receiving the guest configuration profile, temporarily override the default profile and generate a guest interactive portal including a guest indication acknowledgement, the guest channel preference presentation, and the guest service preference presentation;

in response to receiving the guest configuration profile, activate a local area wireless network for a guest device to a network associated with the hospitality establishment;

the local area wireless network having identical behavior to a home wireless network belonging to the guest, the local area wireless network providing identical network configuration and device and service login credentials as the home wireless network;

in response to receiving a default profile, generate a default interactive portal;

forward one of the guest interactive portal and the default interactive portal to the television via the television output;

the guest configuration profile configuring the local area wireless network to be a guest private wireless network that acts as an access point having the same network configuration, SSID, and login credentials for devices, applications, and services as the home wireless network belonging to the guest, thereby creating a home away from home environment for the guest with provisioning for room-specific guest preferred features, including room temperature and television lineup; and the guest configuration profile requiring no new room configuration, the guest configuration profile accessing needed information and data to provision the guest wireless network from one of a co-located server and a cloud-located server.

20. The television as recited in claim 19, wherein the memory includes processor-executable instructions that, when executed, cause the processor to receive a guest configuration profile via a wireless signal received at a transceiver associated with the television, the transceiver being coupled to the busing architecture.

* * * * *